United States Patent

[11] 3,580,991

[72] Inventor Gerhard Krause
Darmstadt, Germany
[21] Appl. No. 811,989
[22] Filed Apr. 1, 1969
[45] Patented May 25, 1971
[73] Assignee Fernseh GmbH
Darmstadt, Germany
[32] Priority Apr. 3, 1968
[33] Germany
[31] P 17 74 082.8

[54] AUTOMATIC TIME CORRECTION CIRCUIT FOR COLOR TV SIGNALS
7 Claims, 2 Drawing Figs.

[52] U.S. Cl. .......... 178/5.4, 178/6.6
[51] Int. Cl. .......... H04n 5/21, H04n 5/78, H04n 9/12
[50] Field of Search .......... 178/5.4 (CR), 6.6 (A), 69.5 (DC), (Inquired)

[56] References Cited
UNITED STATES PATENTS
3,428,745 2/1969 Coleman .......... 178/6.6
3,504,111 3/1970 Sumida .......... 178/5.4

*Primary Examiner*—Bernard Konick
*Assistant Examiner*—Howard W. Britton
*Attorney*—Ernest F. Marmorek

ABSTRACT: An automatic time correction circuit for color TV signals which are received from a magnetic storage device, such as a tape, in which the delayed color TV signal is compared in phase with a first reference signal, then the compared output signal is again compared with a second reference signal and, the output from the second comparator is superimposed on the output of the first comparator.

Figure 1:
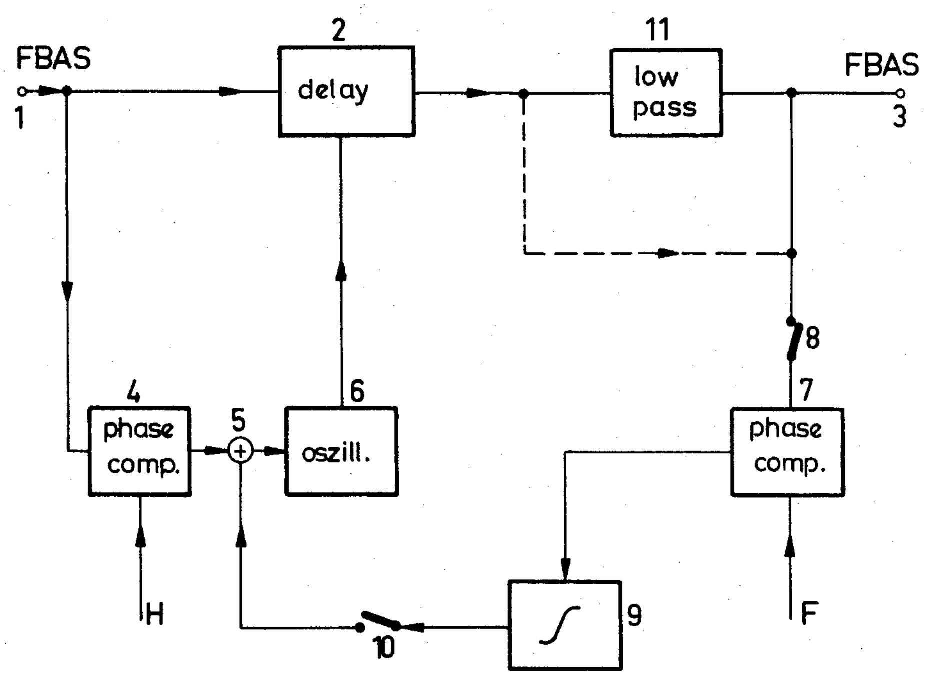

Inventor:
Gerhard Krause by [signature]
Attorney.

AUTOMATIC TIME CORRECTION CIRCUIT FOR COLOR TV SIGNALS

The present invention relates to a circuit arrangement for the time correction of signals, such as color TV signals which are preferably taken off a magnetic storage device, such as a magnetic tape.

Despite the fact that high mechanical accuracy has been achieved in the field of magnetic recording of the TV signals and in the field of data processing and that the equipment which controls the tape-advancing and head-driving mechanism is quite accurate it is still impossible to reproduce a signal which would be free from time errors. Such time errors appear especially disturbing when color TV signals are reproduced and they become apparent in the form of strong color adulterations.

There are methods known for the correction of time errors in signals which are taken off a magnetic tape. According to these methods, the signal is passed through a controlled transition time-type delay network which consists of a large number of LC-type low-pass filters in which the capacitors are represented by semiconductor type diodes, the capacity of which can be changed in accordance with the magnitude of the applied DC voltage. The transit time of the controlled delay network can be changed only on a small range with respect to the overall transit time. Therefore, in employing these methods, it becomes necessary to delay the signal by a considerably longer period than it actually is necessary for the correction of the time errors. Due to this additional delay, the control of the delay process cannot be accomplished quickly enough; therefore it becomes necessary to connect a so-called automatic color time corrector or fine time corrector circuit following the coarse time corrector circuit. The fine time corrector circuit is controlled by the color burst.

According to another known method which is free from the above described shortcomings, the signal is passed through a tapped transit-time-type delay network and according to each of the particular time errors, a respective tap is selected which then further translates the TV signal. This method, however, in its requirement of the tap selection on the transit-type delay network becomes too complicated and the steps or periods between the respective tap selections become relatively large, so that this method permits only a coarse correction of the time errors. Again, a further time corrector circuit is required which has either smaller stages or consists of controlled transit-time-type delay networks to perform the fine correction.

It is, therefore, among the principal objects of the present invention to provide a circuit arrangement for the time correction of signals which are taken off a magnetic storage device, such as a storage tape, and in which a relatively small number of components is required.

It is another object of the invention to provide a time correcting network of the above type which requires only a slight constant additional delay of the TV signals for its operation.

It is still another object of the invention to provide a time correcting network of the above type in which instead of a pair of transit-time-type delay networks, as in the known devices, only a storage-type delay network is used.

The invention provides a circuit arrangement for the correction of time errors in signals, preferably color TV signals, which are taken off a magnetic storage device, such as a storage tape, and in which the signal is passed over a delay network comprising a plurality of analog-type storage devices connected by active circuit elements which translate the signal from one storage device to the next in accordance with a synchronizing pulse, the frequency of which is at least twice the frequency of the highest frequency present in the TV signal, a phase comparator circuit in which the phase of the undelayed signal is compared with a first reference signal, the output signal of that phase comparator circuit being controlled by the frequency of an oscillator which in turn produces the synchronizing pulses for the storage-type delay network; then the phase of the delayed signal will be compared in a second phase comparator circuit with the phase of a second reference signal, and the output signal of the second phase comparator circuit superimposed on the output signal of the first phase comparator circuit.

Figure 2:
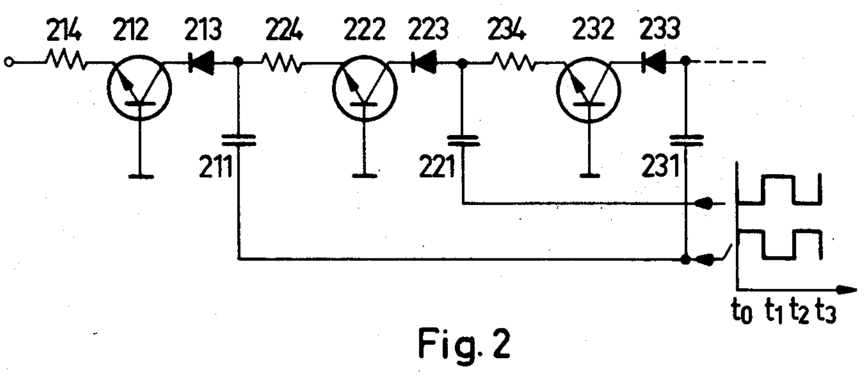

The invention will become more readily apparent from the following description of a preferred embodiment thereof shown, by way of example, in the accompanying drawing, in which:

FIG. 1 is a block diagram of the phase time correcting circuit arrangement according to the preset invention; and FIG. 2 is a circuit diagram of the storage-type delay network used in FIG. 1.

With reference to the drawing it is seen that the color TV signal FBAS is received at input 1 of the time correcting circuit and it enters first the input of the storage-type delay network 2. The storage-type delay network 2 is capable of delaying analog-type signals, that is signals which may assume any value between two limit values. The operation of the storage-type delay network 2 will be described below in greater detail in connection with the description of FIG. 2.

It is noted that the delay-type network shown in FIG. 2 is an exemplary embodiment and variations and modifications are possible within the scope of the present invention.

The capacitors 211, 221, 231 etc. represent the analog-type storage device. The signal to be delayed enters the delay network over resistor 214. The capacitors receive square-shaped synchronizing pulses, the relation of and the behavior of which is shown plotted with respect to time on a small diagram adjacent to FIG. 2.

The synchronizing pulses on capacitors 211, 231, that is on every first and third capacitor of the network, are opposite in phase with respect to the synchronizing pulses on the capacitors 221, 241 etc., that is on every second and fourth capacitor of the delay network. At the time period $t_o$, the base of the capacitor 211 becomes positive. The transistor 212 conducts a charge into the capacitor 211 which corresponds to the instantaneous value of the input signal. At the time $t_1$ the base of the capacitor 211 becomes negative. The diode 213 prevents a back flow of the charge to the input of the storage network.

Inasmuch as the transistor 222 starts to conduct due to the presence of a negative potential on its emitter, the charge flows over this transistor into the capacitor 221. At the time $t_2$, the capacitor 211 will receive a charge that corresponds to the next instantaneous value of the signal, and the charge from the capacitor 221 passes over the transistor 232 into the capacitor 231.

The above-described process repeats itself continuously so that the charges corresponding to the instantaneous values will reach the end of the delay network where they can be taken off as the delayed signal. The components of the delayed signal which are solely due to the synchronizing pulses can be suppressed by passing the signal through a low-pass filter, such as the filter 11.

The transit time of the storage-type delay network is inversely proportional to the frequency of the synchronizing pulses. As a result, the transit time of the storage-type delay network can be varied in terms of the synchronizing pulses by controlling the frequency of the oscillator 6 producing the synchronizing pulses.

From the output of the storage-type delay network 2, the signal enters a low-pass filter 11 before it enters an output 3 of the circuit arrangement. The remaining portion of the circuit arrangement effects the operation of the delay network 2; therefore, any signal arriving at the output 3 of the network is effected by the remaining portion of the circuit as hereinafter described. The horizontal synchronizing pulse of the undelayed color TV signal enters a phase comparator circuit 4 where it is compared with a reference pulse H that has a frequency corresponding to the horizontal frequency. The output from this phase comparator circuit 4 is passed over an adding stage 5 into oscillator 6.

An oscillator 6 produces the synchronizing pulses for the storage-type delay network 2. The color burst of the delayed color TV signal, that is, after it has passed the delay network 2 enters, through switch means 8 which is closed only during the period of the color burst, a second phase comparator circuit 7 where it is compared in its phase with a reference color carrier signal F. The output voltage or signal of the second phase comparator circuit 7 enters an integrating network 9.

Towards the end of the color burst, a voltage is produced in the integrating network 9 which corresponds to the phase difference between the delayed color burst and the reference color carrier F. This voltage enters, through a switch means 10, and adding stage 5 where it becomes superimposed on the output of the first phase comparator circuit 4 and thereby also effects the operation of the oscillator 6. As a result, time errors which could not be corrected by the effect of the phase of the first comparator circuit 4, will be eliminated.

Reproducing AM or FM recorded color TV signals the use of the low-pass filter 11 does not create any additional complication, as a low-pass filter must be present any way in the path of the color TV signals after it becomes demodulated as coming from the magnetic storage device. The signal which is conducted to the switch means 8 can be taken off also before the low-pass filter 11 (as shown in broken lines) if, as it is in most cases, a low-pass or band-pass filter has been already provided within the phase comparator circuit 7.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A circuit arrangement, for use in a color television system for time correcting the color TV signal, comprising
   - a delay network for imparting to the signal a predetermined delay,
   - control-signal-producing means coupled to said delay network and producing a control signal therefore having a frequency at least twice the value of the highest frequency of said TV signal,
   - a first phase comparator circuit receiving said TV signal prior to its delay and comparing the phase thereof with a first reference signal, said first phase comparator circuit producing an output signal coupled to said control signal producing means,
   - a second phase comparator circuit coupled to the output of said delay network receiving the delayed output signal thereof and comparing said delayed output signal with a second reference signal and producing an output signal, and
   - means coupled to the output of said second phase comparator circuit for superimposing said output signal thereof on the output signal of said first phase comparator circuit.

2. The circuit arrangement as claimed in claim 1, wherein said control-signal-producing means is an oscillator means.

3. The circuit arrangement as claimed in claim 1, wherein said delay network comprises a plurality of storage devices, active circuit elements coupling said storage devices and translating said color TV signal from the associated storage device to an adjacent stage storage device in accordance with the frequency of said control signal.

4. The circuit arrangement as claimed in claim 1, wherein said first reference signal is a pulse having a frequency of the horizontal signal frequency and said color TV signal is the horizontal synchronizing signal of said color TV signal which are compared in phase in said first phase comparator circuit first switch means connected between said delay network and said second phase comparator circuit for conveying the color burst of said delayed color TV signal thereto, said switch means being in closed position only during the period of said color burst, said second reference signal being a color carrier signal.

5. The circuit arrangement as claimed in claim 4, wherein an integrating network is connected to the output of said second phase comparator circuit for receiving said output signal of said second phase comparator circuit, second switch means coupled to the output of said integrating network and being in closed position only during the interval between adjacent color bursts, and wherein said superimposing means is an adding network connected between said first phase comparator circuit and said control signal producing means and to the output of said second switch means.

6. The circuit arrangement as claimed in claim 4 wherein a low-pass filter network is connected between said first switch means and said delay network.

7. The circuit arrangement as claimed in claim 6 wherein said low pass filter is operable to limit the frequency range of the color TV signal, said color TV signal being received from a magnetic storage device and demodulated prior to entering said low-pass filter.